United States Patent [19]
Weger

[11] Patent Number: 5,558,678
[45] Date of Patent: Sep. 24, 1996

[54] PROCESS AND APPARATUS FOR CONTINUOUS CRYSTALLIZATION OF PLASTIC GRANULES

[75] Inventor: Friedrich Weger, Berlin, Germany

[73] Assignee: Karl Fischer Industrieanlagen GmbH, Berlin, Germany

[21] Appl. No.: 495,093

[22] Filed: Jun. 27, 1995

Related U.S. Application Data

[63] Continuation-in-part of Ser. No. 150,832, Nov. 12, 1993, abandoned.

[30] Foreign Application Priority Data

Nov. 13, 1992 [EP] European Pat. Off. .............. 92250334

[51] Int. Cl.$^6$ .............................. B01D 9/00; B29B 13/02
[52] U.S. Cl. .................................... 23/295 R; 23/313 FB; 528/502 R; 528/503; 585/899; 422/245.1
[58] Field of Search .............................. 23/295 R, 308 R, 23/313 FB; 528/483, 490, 502, 503; 422/245.1; 585/899

[56] References Cited

U.S. PATENT DOCUMENTS

| | | | |
|---|---|---|---|
| 4,120,849 | 10/1978 | Breitschaft et al. | 528/502 |
| 4,226,973 | 10/1980 | Malo et al. | 528/481 |
| 4,231,991 | 11/1980 | Müller | 422/245 |
| 4,584,366 | 4/1986 | Gerking et al. | 528/502 |
| 4,963,644 | 10/1990 | Duh | 528/272 |
| 5,290,913 | 3/1994 | McAllister et al. | 528/483 |

FOREIGN PATENT DOCUMENTS 3213025 3/1990 Germany .

OTHER PUBLICATIONS

European Search Report, EP 92 25 0334.
Patent Abstracts of Japan, vol. 13, No. 237 (M–833) (3585), Jun. 5, 1989.
Inernationl Publications WO 89/11073.

Primary Examiner—Gary P. Straub
Attorney, Agent, or Firm—Young & Basile, P.C.

[57] ABSTRACT

A process and an apparatus for the continuous crystallization of plastic granules, particularly amorphous plastic granules, in which the granules are introduced into a container and form a granule bed, which is moved downwards by the action of gravity. A hot gas is passed as a primary gas in a countercurrent manner through the granule bed. The granules are kept moving by a stirrer. There is also a gas supply for a secondary gas, which introduces the secondary gas at high speed at several points distributed over the cross-section of the container into the upper area of the granule bed.

7 Claims, 2 Drawing Sheets

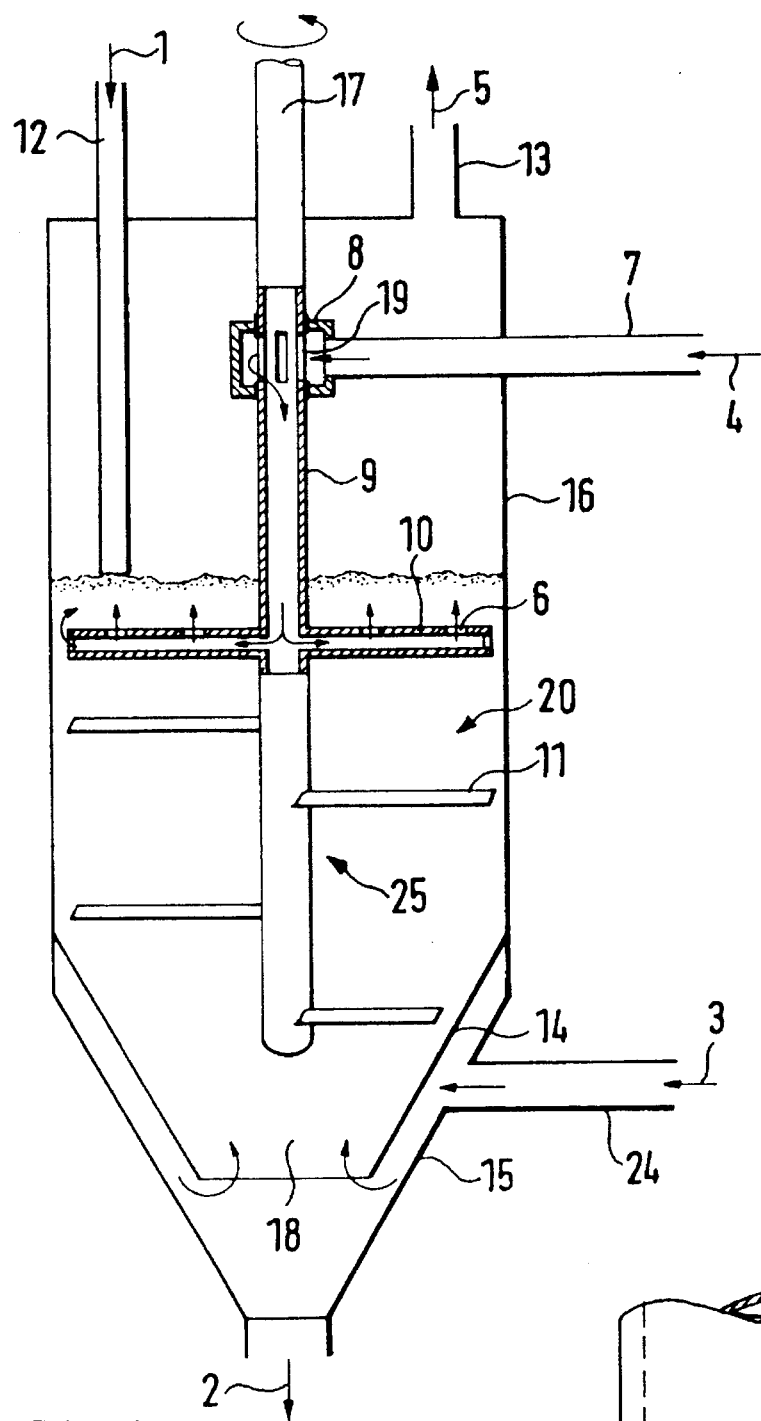
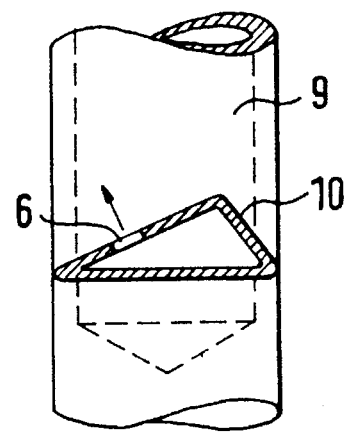
FIG.1
FIG.2

PROCESS AND APPARATUS FOR CONTINUOUS CRYSTALLIZATION OF PLASTIC GRANULES

This application is a Continuation-In-Part of application Ser. No. 08/150,832, filed on Nov. 12, 1993, now abandoned.

BACKGROUND OF THE INVENTION

The invention relates to a process and an apparatus for the continuous crystallization of plastic granules, particularly, amorphous plastic granules.

It is known that with homopolymers or copolymers based on polyethylene terephthalate (PET) on passing from the amorphous into the crystalline state in the temperature range approximately 70° to 160° C., there is a softening and a partial melting, so that the granules have a varying tendency to strongly stick together. On passing through this sticking phase it is necessary to keep the individual granules permanently moving and to avoid longer contact times, which would lead to the fusing together to form larger agglomerates. In order to attain and maintain such an intense movement the prior art provides a number of different processes.

In the conventional fluidized bed a hot gas flows through the granule bed in a quantity such that the individual granules in the fluidized state are heated to the crystallization temperature and crystallized. However, this process is very energy-intensive due to the necessarily large air quantity. Experience has shown that this gentle fluidization is no longer adequate in the crystallization of modified polyester, a polyester with a higher concentration of organic or inorganic co-components, since larger agglomerates form because the stickiness is increased by these components.

An even more intense turbulence and therefore a reduction of agglomerate formation during the crystallization phase is brought about by a pulsating gas flow based on the effervescent layer process, but this process is also very energy-intensive and involves high apparatus expenditure.

A process in which the granules are kept moving by stirring or agitating members has proved satisfactory (DE 32 13 02.5). The granule bed flows through the agitated vessel from top to bottom and in a countercurrent manner a hot gas blown in to the lower part of the reactor is heated to the necessary crystallization temperature. A sticking together of the individual granules on passing through the critical sticking phase is prevented by a slowly rotating stirrer. This process has proved particularly satisfactory for homopolyesters because compared with the previously described processes it represents both an energy and an apparatus minimum. However, if according to this process a copolyester is crystallized, the mechanical movement of the granules by the mixing blades is no longer sufficient as a result of the crystallization speed reduced by the co-component and the resulting intensified and extended sticky phase, so that. agglomerate-free crystallization cannot be ensured.

The problem of the present invention is therefore to provide a process and an apparatus for the continuous crystallization of plastic granules, particularly amorphous plastic granules, in which an intense movement of the granules is ensured both in time and locally in the area where the transition from the amorphous to the partly crystalline state takes place, i.e. in that area having the greatest sticking tendency.

SUMMARY OF THE INVENTION

In the process and apparatus according to the invention the intense movement is brought about by the planned supply of a gas flow to different points placed over the cross-section and which is introduced by means of nozzles into the bed area. These nozzles are located in the top stirring arms of the stirrer and as a result of the rotary movement of the stirrer pass over the entire cross-section of the cylindrical crystallizer. The necessary gas flow is introduced from the exterior into the crystallizer by means of a distributing ring in the stirring shaft, which in this area is constructed as a hollow shaft and is distributed by the shaft into one or more of the upper stirring arms, which are also constructed as hollow profile blades. From the hollow blades the gas passes out with a high speed (120–150 meters per sec.) via one or more nozzle openings and, in the vicinity of the overlying granule bed, which has a height of 20 to 80 mm, and preferably 30 to 50 mm, brings about a fountain-like expulsion with violent turbulence and a correspondingly intense movement with only a short contact time of the crystallizing granules. With such an eruption-like ejection there is also the positive effect of remixing with already partly crystallized granules, i.e. granules having surfaces with a lesser sticking tendency, which further reduces the risk of agglomerate formation.

BRIEF DESCRIPTION OF THE DRAWINGS

An embodiment of the invention is described in greater detail hereinafter with reference to the attached drawings, wherein:

FIG. 1 is a part section diagrammatic side view of the apparatus according to the invention;

FIG. 2 is a partial view of the stirring shaft with a stirring arm located therein in a sectional representation.

DESCRIPTION OF THE PREFERRED EMBODIMENT

Figure 3:
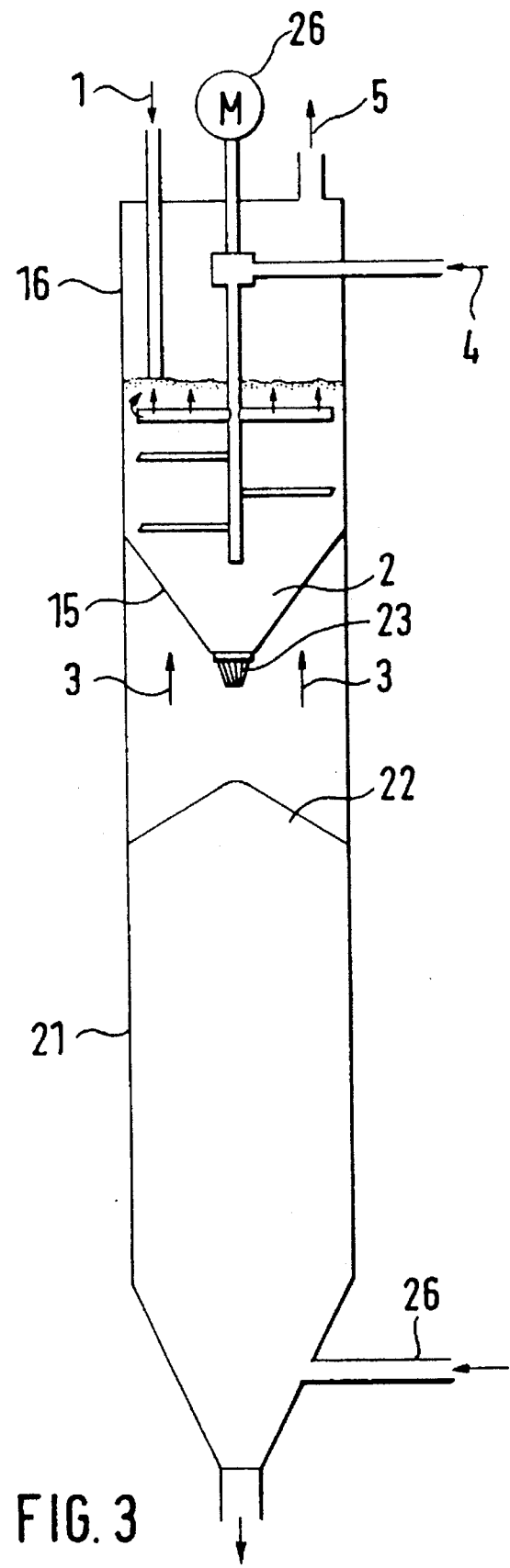
FIG. 3 is a diagrammatic view of a reactor for continuous after-condensation and in which the apparatus according to the invention is used.

The apparatus shown in simplified form in FIG. 1 has a cylindrical container 16 with a conical granule outlet connection 15, whose angle of inclination is preferably 25° to 30°. A double-walled, cooled granule supply pipe 12 is located in the upper area of the container 16 and projects into the interior of the container 16, the end of the supply pipe 12 simultaneously limiting the granule bed height in the container 16 or crystallizer and therefore also determines the level of the granules. The container 16 is provided with an inner cone 14 projecting into the granule outlet connection 15. A supply line 24 for the primary gas 3 is provided in the granule outlet connection 15. A gas outlet connection 13 for removing the waste gas 5 is provided in the upper area of the container 16.

A stirrer 25 projects into the container, which stirrer 25 has a stirrer shaft 17 driven by means of a geared motor 26 and stirring arms 10, 11. Part of the stirrer shaft 17 is constructed as a hollow shaft 9, whose interior is linked via slots 19 in the wall of the hollow shaft 9 and a distributing ring 7 forming an annular cavity and fitted in the vicinity of the slots 19 with a supply line 7 for a secondary gas 4. At least the stirring arms located in the upper area of the granule bed 20 are constructed as hollow profile blades 10, whose interior is once again connected to the interior of the hollow shaft 9. In the hollow profile blades 10 there are provided upwardly directed nozzles 6 having a diameter of 1 to 8 mm, and preferably 3 to 5 mm, as a function of the cross-sectional surface of the container 16. As is shown in FIG. 2, the hollow profile blade 10 can have a triangular cross-section, the nozzles 6 being positioned in the upwardly directed side walls. In the upper area of the granule bed there are provided two or more hollow profile blades 10 in one plane and in the underlying areas the stirrer shaft 17 is equipped with several and preferably four to eight solid profile blades 11.

The amorphous granules 1 are preferably continuously introduced into the crystallizer by means of the supply pipe 12, so that the granule bed 20 flowing downwards from the granule outlet connection 15 is continuously topped up to the bed height determined by the end of the supply pipe 12. The primary gas 3 flowing in via the supply line 24 flows into the annular intermediate area on the outer wall of the inner cone 14 formed by the inner cone and the granule outlet connection 15 and at reference number 18 enters the granule bed 20 and flows vertically through the granule bed 20 in a countercurrent manner. The temperature of the gas flow 3 corresponds to the desired crystallization temperature of the granules. In the upper area of the granule bed 20, the gas flow is used for heating the amorphous granules from ambient temperature to crystallization temperature and for removing the heat of crystallization from the zone. The primary gas/granule mass flow ratio is 2 to 4 kg/kg and preferably 2.5 to 3 kg/kg.

The secondary or fluidizing gas 4, as a function of the requirements of the granule characteristics, is supplied as cold or hot gas via the supply line 7 to the distributing ring 8 and is passed from the ring 8 via the slots 19 into the hollow shaft 9 of the stirrer 25 and from the stirrer 25 via the radial openings into the hollow profile blades 10. From there it flows via one or more nozzles with a high speed (as high as 120–150 m/sec.) into the amorphous granule covering layer and leads to the desired intense turbulence of the granules. The nozzles 6 are in a fluidized layer depth of 20 to 80 mm and preferably 30 to 50 mm, which is 4–6% of the total granule column being passed through by the primary gas 3. The stirrer shaft 17 is driven by means of the geared motor at a speed between two and three revolutions per minute, so that the entire cross-section of the granule covering layer is subject to turbulence. The high speed of the gas flow via the nozzles, in combination with the rotating stirrer provide a rotating spouting bed of granules. The hot gas formed from the primary gas 3 and the secondary gas 4 finally leaves the container 16 via the waste gas connection 13.

The amorphous granules freshly supplied by means of the supply pipe 12 are heated in the upper area of the granule bed 20 and are simultaneously subject to turbulent action so that sticking cannot occur. After passing through the heating-up and initial crystallization phase, which last approximately 3 to 5 minutes, through the constant dropping of the granule bed 20, the granules fall into lower areas in which the stirring arms 11, through which there is no longer a gas flow, bring about a gentle pushing and sliding movement of the individual granules. The hot gas coming from below in a countercurrent manner flows through this part of the granule bed 20. The gas quantity is reduced to a minimum and is dimensioned in such a way that it is just possible to ensure the heating capacity for heating the granules to the crystallization temperature and a uniform through-flow over the entire container cross-section. Isothermal conditions already exist just below the heating-up zone and as a result of the residence time which is a multiple higher and the confined residence time range compared with that in the upper turbulence zone lead to a constant degree of crystallization.

FIG. 3 shows the container 16 integrated into a shaft dryer or reactor for continuous after-condensation and, together with the lower reactor part, the container 16 forms a continuous tubular reactor as a single unit. On the granule outlet connection 15 there is provided a granule lock 23 by means of which the crystallized, heated granules 2 pass into the lower reactor part 21. In this case the hot dry gas passing out of the granule layer 22 and supplied to the lower area of the lower reactor part by means of the feedline 26 serves as the primary gas 3. The granule outlet connection is constructed as a screen cone and in this way the primary gas 3 enters the crystallizer.

What is claimed is:

1. In a process for the continuous conversion of granules of amorphous plastic to granules of crystalline plastic, in which amorphous granules of plastics are introduced into a container to form a bed which moves downward under the influence of gravity, while being mechanically stirred and while a hot gas is passed as a primary gas in a countercurrent manner through the bed of granules, the improvement which comprises, provilding a rotating gas supply means in the transitional region of said bed of granules where the granules change from an amorphous state to a partially crystalline state;

expelling secondary gas from said gas supply means at a gas velocity of 120–150 meters/second so that the granulate layer overlaying the gas supply means is subjected to fountaining and turbulence from the combination of forces resulting from said rotating gas supply means and the action of the secondary gas, while maintaining an upward flow of the secondary gas together with the primary gas.

2. The process according to claim 1, characterized in that the secondary gas is expelled at a layer depth of 20 to 80 mm.

3. The process according to claim 2 characterized in that the secondary gas is expelled at a layer depth of 30 to 50 mm.

4. In a process for the continuous conversion of granules of amorphous plastic to granules of crystalline plastic, in which amorphous granules of plastics are introduced into a container to form a bed which moves downward under the influence of gravity, while being mechanically stirred by rotating a plurality of stirrers longitudinally spaced from each other along a longitudinal axis of said container, while a hot gas is passed as a primary gas in a countercurrent manner through the bed of granules, the improvement which comprises, providing a gas supply passage in the uppermost stirrer of said plurality of stirrers in said bed of granules;

expelling secondary gas from said gas supply passage at a gas velocity of 120–150 meters/second so that the granulate layer overlaying the gas supply passage is subjected to fountaining and turbulence from the combination of forces resulting from said rotating stirrer and the action of the secondary gas, while maintaining an upward flow of the secondary gas together with the primary gas.

5. The process according to claim 4 wherein the secondary gas is expelled through the gas passage at a layer depth of 20 to 80 mm.

6. The process according to claim 5 wherein the secondary gas is expelled through the gas passage at a layer depth of 30 to 50 mm.

7. A method according to claim 4 wherein said gas passage has an upper first surface and a second surface, said upper surface having apertures for the expelling of the secondary gas into the bed.

* * * * *